US008072150B2

(12) United States Patent  (10) Patent No.: US 8,072,150 B2
Yoon et al.  (45) Date of Patent: Dec. 6, 2011

(54) DISPLAY DEVICE

(75) Inventors: Young-soo Yoon, Suwon-si (KR);
Joon-chul Goh, Seoul (KR);
Chong-chul Chai, Seoul (KR);
Kwang-chul Jung, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 605 days.

(21) Appl. No.: 11/876,606

(22) Filed: Oct. 22, 2007

(65) Prior Publication Data

US 2008/0106207 A1  May 8, 2008

(30) Foreign Application Priority Data

Nov. 8, 2006  (KR) ........................ 10-2006-0110207

(51) Int. Cl.
*G09G 3/10* (2006.01)
*H01L 33/00* (2010.01)

(52) U.S. Cl. .. 315/169.1; 257/52; 257/88; 257/E27.111; 315/149

(58) Field of Classification Search .................. 315/149, 315/158, 169.1–169.3; 345/82, 84, 204, 345/214, 46; 313/498–500, 506; 257/52, 257/82, 84, 88, 184, 257, E27.111, E27.117, 257/E31.093–E31.095, 59, 72, 80, 98
See application file for complete search history.

(56) References Cited

U.S. PATENT DOCUMENTS

| 6,466,281 | B1* | 10/2002 | Huang et al. ..................... 349/44 |
| 6,747,638 | B2* | 6/2004 | Yamazaki et al. ............. 345/207 |
| 7,030,551 | B2* | 4/2006 | Yamazaki et al. ............. 313/498 |
| 7,068,246 | B2* | 6/2006 | Yamazaki et al. ............... 345/76 |
| 7,557,382 | B2* | 7/2009 | Koh et al. ........................ 257/82 |
| 2005/0052435 | A1* | 3/2005 | Cho et al. ....................... 345/182 |
| 2005/0082968 | A1* | 4/2005 | Choi et al. ..................... 313/506 |
| 2006/0060752 | A1* | 3/2006 | Lee et al. .................... 250/208.1 |
| 2006/0202947 | A1* | 9/2006 | Lee ............................... 345/102 |

* cited by examiner

*Primary Examiner* — Jacob Y Choi
*Assistant Examiner* — Jimmy T Vu
(74) *Attorney, Agent, or Firm* — Innovation Counsel LLP

(57) ABSTRACT

A display device, comprising: an insulating substrate; a light sensor which includes a semiconductor layer disposed in a first region and a sensor input terminal and a sensor output terminal electrically connected with the semiconductor layer, and is formed on the insulating substrate; a first electrode, an organic light emitting layer and a second electrode which are sequentially formed on the light sensor; a color filter which is disposed between the insulating substrate and the first electrode, and is formed in a second region that is different from the first region; and a controller which controls a data voltage supplied to one of the first electrode and the second electrode based on an output of the light sensor.

21 Claims, 29 Drawing Sheets

450 110   252 310 510

DISPLAY DEVICE

CROSS-REFERENCE TO RELATED APPLICATIONS

This application claims priority from Korean Patent Application No. 2006-0110207, filed on Nov. 8, 2006, in the Korean Intellectual Property Office, the disclosure of which is incorporated herein by reference.

BACKGROUND OF THE INVENTION

1. Field of the Invention

Apparatus and methods consistent with the present invention relate to a display device and, more particularly, to a display device which provides a stable display quality by using a light sensor.

2. Description of the Related Art

Recently, organic light emitting diode (OLED) displays have been popular because they require lower voltage; are light and small; have a wide viewing angle; and respond with high speed.

The OLED has a plurality of thin film transistors per pixel. Generally, each pixel includes at least two thin film transistors, i.e., a switching thin film transistor connected with a data line, and a driving thin film transistor connected with a voltage supply line.

The thin film transistors typically employ amorphous silicon for the semiconductor layer. However, when the semiconductor layer made of amorphous silicon is used for a long time, the quality of the semiconductor layer becomes unstable. Also, the organic light-generating layer becomes degraded if used for a long time, thereby lowering the quality of emitted light.

SUMMARY OF THE INVENTION

Accordingly, it is an aspect of the present invention to provide a display device which provides a stable display quality, comprising: an insulating substrate; a light sensor which includes a semiconductor layer disposed in a first region and a sensor input terminal and a sensor output terminal electrically connected with the semiconductor layer and formed on the insulating substrate; a first electrode, an organic light emitting layer and a second electrode which are sequentially formed on the light sensor; a color filter which is disposed between the insulating substrate and the first electrode and formed in a second region that is different from the first region; and a controller which controls a data voltage supplied to one of the first electrode and the second electrode based on an output of the light sensor.

According to an aspect of the invention, the semiconductor layer includes amorphous silicon.

According to an aspect of the invention, the organic light emitting layer emits a white light.

According to an aspect of the invention, the first electrode includes indium tin oxide (ITO) or indium zinc oxide (IZO).

According to an aspect of the invention, the second electrode includes a reflective metal layer.

According to an aspect of the invention, the light sensor further includes an ohmic contact layer which is disposed between the semiconductor layer and the sensor input terminal and between the semiconductor layer and the sensor output terminal.

According to an aspect of the invention, the display device further comprises a metal layer which is provided between the semiconductor layer and the insulating substrate to prevent external light from being incident upon the semiconductor layer.

According to an aspect of the invention, the metal layer receives a negative voltage.

According to an aspect of the invention, the display device further comprises a sensor thin film transistor having its control electrode connected to a gate line, its input terminal connected to a sensor line, and its output terminal connected with the input terminal of the light sensor.

According to an aspect of the invention, the display device further comprises a sensor line which is connected with a source electrode of the sensor thin film transistor and supplies a predetermined voltage to the source electrode of the sensor thin film transistor.

According to an aspect of the invention, the display device further comprises a storage capacitor electrode which is integrally formed with the input terminal of the light sensor, and forms a storage capacitance.

According to an aspect of the invention, the display device further comprises a metal layer which is disposed between the insulating substrate and the storage capacitor electrode, and receives a negative voltage.

According to an aspect of the invention, the display device further comprises a transparent electrode layer which is disposed on the storage capacitor electrode, and is electrically connected with the metal layer.

According to an aspect of the invention, the display device further comprises a gate line and a data line which insulatedly cross each other, and the sensor output terminal of the light sensor is electrically connected with the gate line.

The foregoing and/or other aspects of the present invention can be achieved by a display device, comprising: an insulating substrate; a light sensor which includes a semiconductor layer and an input terminal and an output terminal electrically connected with the semiconductor layer, and is formed on the insulating substrate; a first electrode, an organic light emitting layer and a second electrode which are sequentially formed on the light sensor; a color filter layer which assigns colors to a light emitted by the organic light emitting layer, and is not disposed on a path of the light between the organic light emitting layer and the light sensor; and a controller which controls a data voltage supplied to one of the first electrode and the second electrode based on an output of the light sensor.

According to an aspect of the invention, the semiconductor layer includes amorphous silicon.

According to an aspect of the invention, the organic light emitting layer emits a white light.

According to an aspect of the invention, the semiconductor layer is formed in a first region, and the color filter layer is formed in a second region, other than the first region, between the insulating substrate and the first electrode.

According to an aspect of the invention, the color filter layer is formed on the second electrode.

According to an aspect of the invention, the display device further comprises an encapsulating substrate which is disposed over the second electrode, and the color filter layer is formed on the encapsulating substrate.

According to an aspect of the invention, the first electrode includes a reflective metal layer which is formed with an aperture corresponding to the semiconductor layer.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF EMBODIMENTS

Hereinafter, embodiments of the present invention will be described with reference to accompanying drawings, wherein like numerals refer to like elements and repetitive descriptions will be avoided as necessary.

Figure 1:
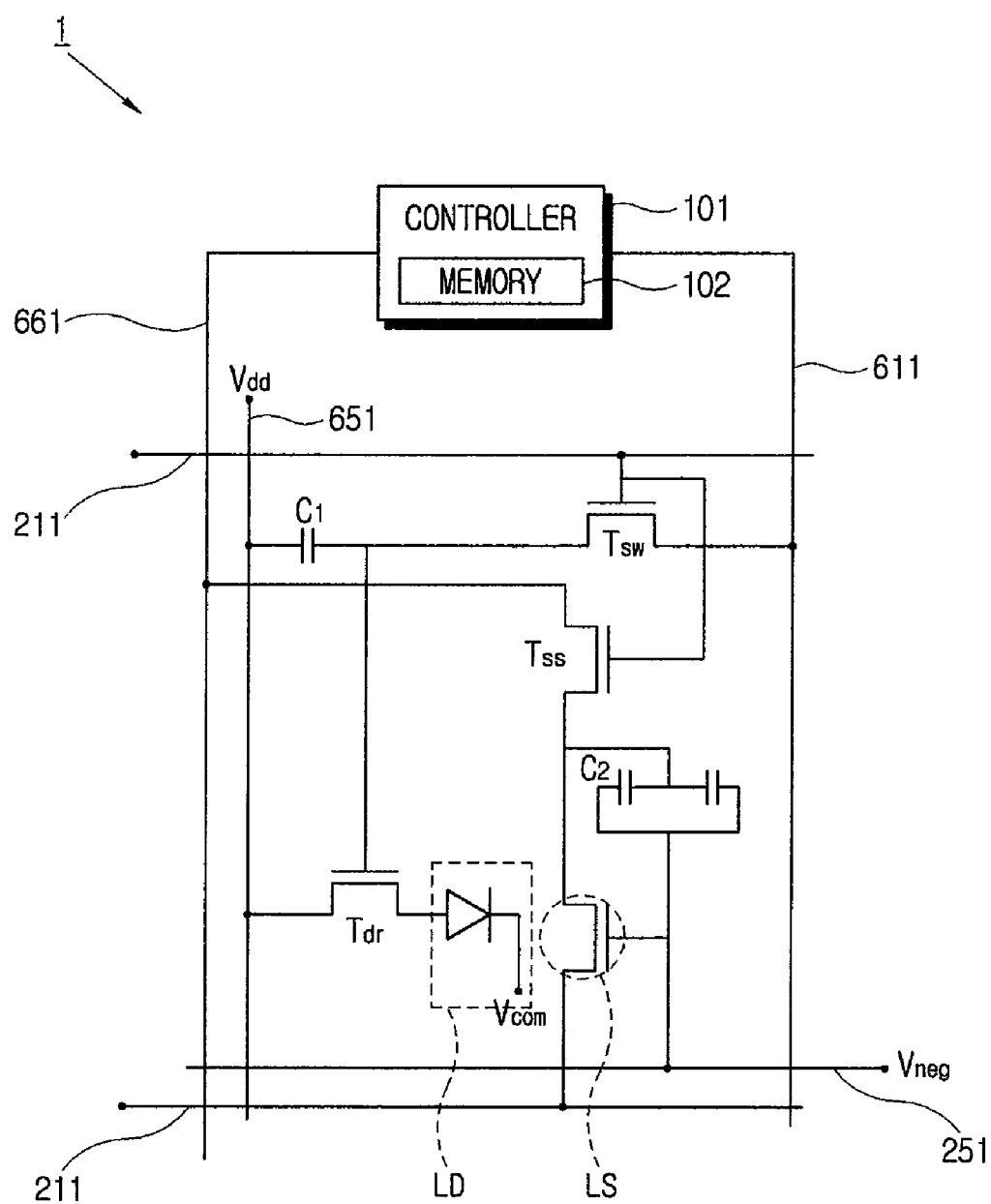
FIG. 1 illustrates an equivalent circuit of a display device according to a first exemplary embodiment of the present invention.

FIG. 1 illustrates an equivalent circuit of a display device according a first exemplary embodiment of the present invention.

As shown in FIG. 1, display device 1 includes a plurality of signal lines 211, 251, 611, 651 and 661. Signal lines 211, 251, 611, 651 and 661 include a gate line 211 which transmits a scanning signal; a negative electrode line 251 which supplies a negative voltage; a data line 611 which transmits a data signal; a voltage supply line 651 which supplies a driving voltage; and a sensor line 661 which is connected with a sensor thin film transistor Tss.

Each of the pixels includes an organic light emitting element LD, a switching thin film transistor Tsw, a driving thin film transistor Tdr, a sensor thin film transistor Tss, a light sensor LS and capacitors C1 and C2.

The driving thin film transistor Tdr includes a control terminal, an input terminal and an output terminal. The control terminal is connected with the switching thin film transistor Tsw. The input terminal is connected with the voltage supply line 651. The output terminal is connected with the organic light emitting element LD.

The organic light emitting element LD includes an anode which is connected with the output terminal of the driving thin film transistor Tdr; and a cathode which is connected with a common voltage Vcom. The organic light emitting element LD emits light in different intensity ranges depending on the output current of the driving thin film transistor Tdr, thereby displaying an image. The output current of the driving thin film transistor Tdr varies depending on the voltage applied between the control terminal and the output terminal.

The switching thin film transistor Tsw includes a control terminal, an input terminal and an output terminal. The control terminal is connected with the gate line 211, and the input terminal is connected with the data line 611. The output terminal is connected with the control terminal of the driving thin film transistor Tdr. The switching thin film transistor Tsw transmits the data signal from the data line 611 to the driving thin film transistor Tdr according to the scanning signal supplied through the gate line 211.

The capacitor C1 is connected between the control terminal and the input terminal of the driving thin film transistor Tdr. The capacitor C1 charges and maintains the data signal input to the control terminal of the driving thin film transistor Tdr.

The switching thin film transistor Tsw and the driving thin film transistor Tdr become degraded and perform poorly after being driven for some time. The sensor thin film transistor Tss, the light sensor LS, the capacitor C2 and the negative electrode line 251 compensate for the deterioration of the switching thin film transistor Tsw and the driving thin film transistor Tdr.

The sensor thin film transistor Tss includes a control terminal, an input terminal and an output terminal. The control terminal is connected with the gate line 211. The input terminal is connected with the sensor line 661. The output terminal is connected with the light sensor LS and the capacitor C2.

The capacitor C2 is connected between the output terminal of the sensor thin film transistor Tss and the negative electrode line 251. The capacitor C2 charges and maintains the voltage inputted to the input terminal of the sensor thin film transistor Tss.

The light sensor LS includes a semiconductor layer, an input terminal which is connected with a first end of the semiconductor layer and the output terminal of the sensor thin film transistor Tss, and an output terminal which is connected with a second end of the semiconductor layer and the next gate line 211.

By receiving light from the organic light emitting element LD, the semiconductor layer of the light sensor LS decreases in resistance and current flows in the semiconductor layer from its input to its output terminal, thereby decreasing the charge of capacitor C2. The stronger the incident light is, the more the charge of capacitor C2 decreases, which requires more current to be supplied through the sensor line 661.

Regardless of the applied data voltage, the intensity of light incident to the semiconductor layer of the light sensor LS will vary depending on the deterioration of the switching thin film transistor Tsw and the driving thin film transistor Tdr.

As described above, there is a correlation among the deterioration of the switching thin film transistor Tsw and the driving thin film transistor Tdr, the intensity of light incident from the organic light emitting element LD to the semiconductor layer, the intensity of the current flowing in the output terminal of the light sensor LS, the decreased charge of the capacitor C2, and the amount of the current supplied through the sensor line 661 to compensate for the decreased charge of the capacitor C2.

Controller 101 controls the data voltage supplied to the data line 611 on the basis of the amount of the current supplied through the sensor line 661, thereby compensating for the deterioration of the switching thin film transistor Tsw and the driving thin film transistor Tdr.

A memory 102 is connected with the controller 101 and stores a table of current values supplied through the sensor line 661 according to levels of the data voltage. The controller 101, using information in the table in memory 20, compensates for the deterioration of response of the switching thin film transistor Tsw and the driving thin film transistor Tdr to various data voltages.

Hereinafter, a configuration of the display device 1 will be described in detail with reference to FIGS. 2 to 5.

Figure 2:
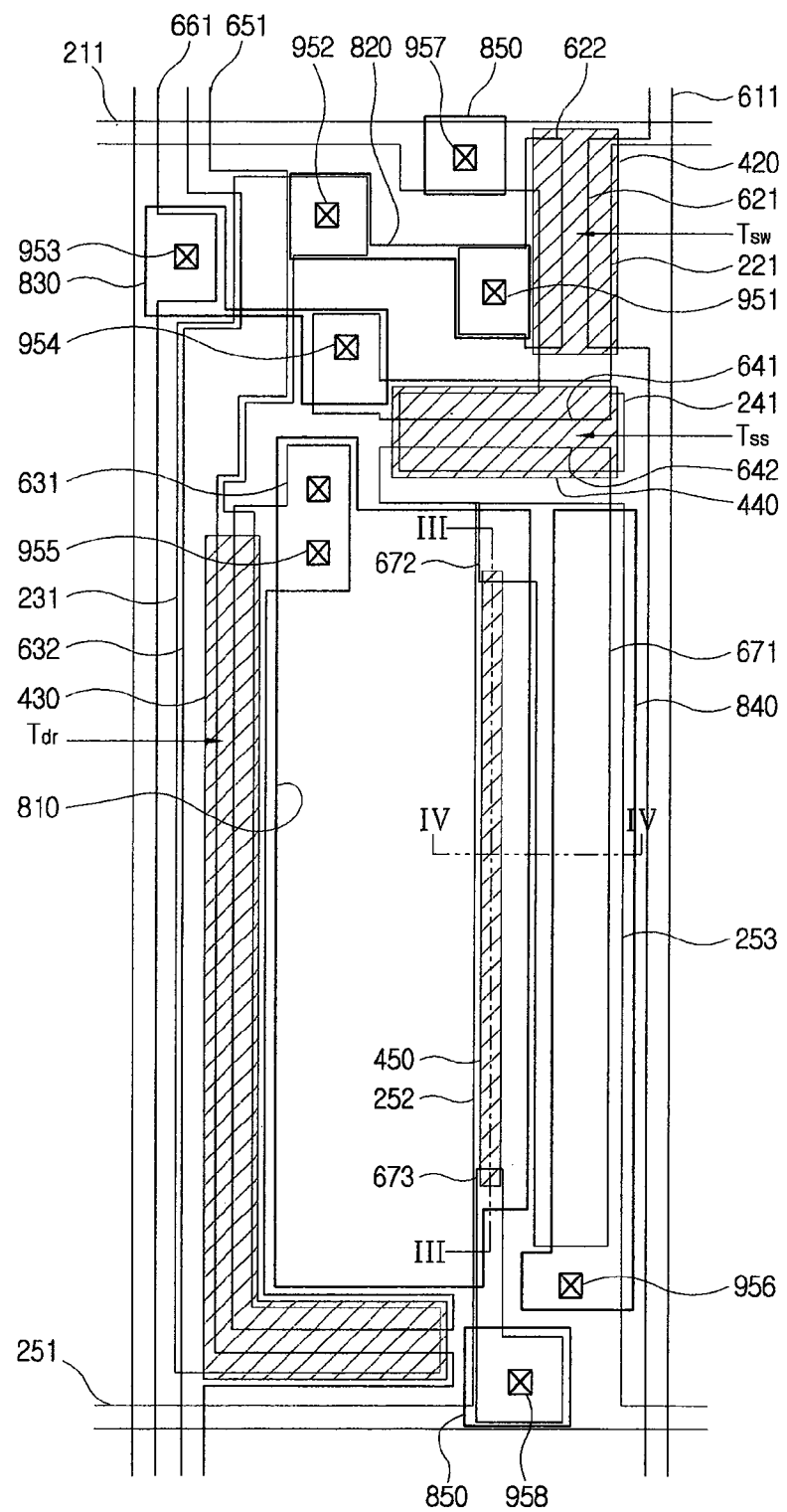
FIG. 2 illustrates an arrangement of the display device according to the first exemplary embodiment of the present invention.
Figure 3:
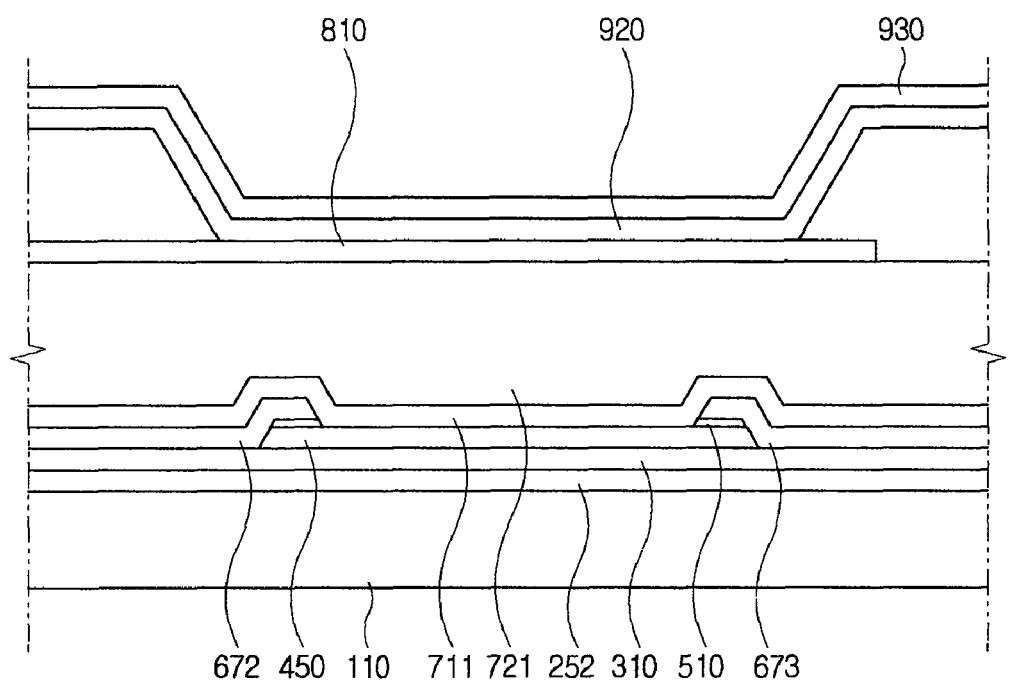
FIG. 3 is a sectional view of the display device according to the first exemplary embodiment of the present invention, taken along line III-III in FIG. 2.
Figure 4:
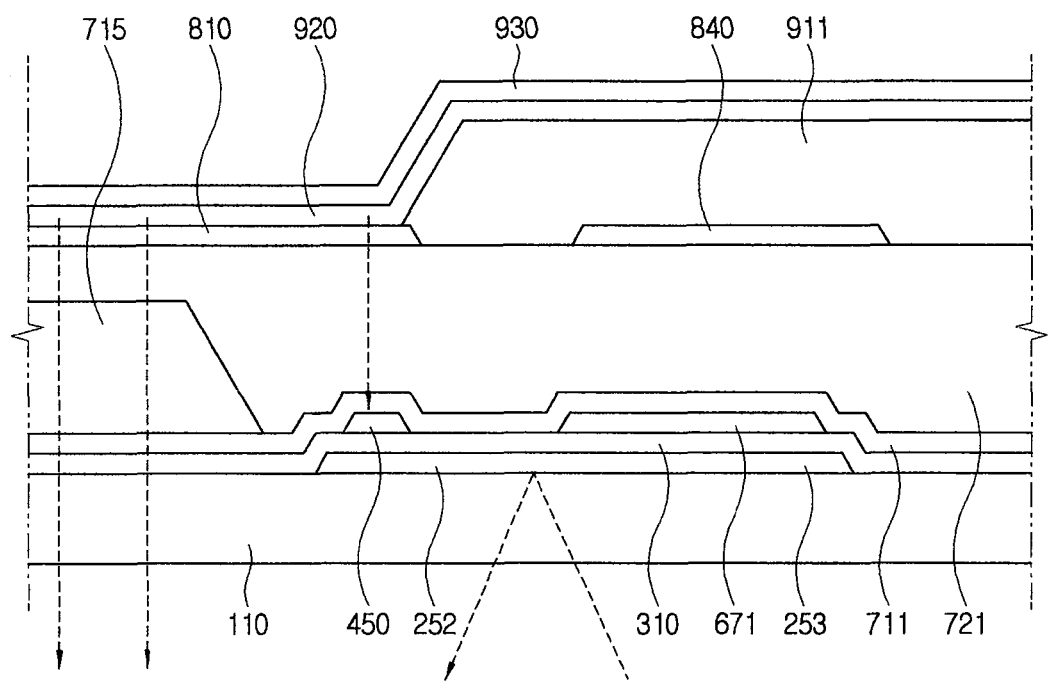
FIG. 4 is a sectional view of the display device according to the first exemplary embodiment of the present invention, taken along line IV-IV in FIG. 2.

As shown in FIGS. 2 to 4, gate wires which include the gate line 211, a switching gate electrode 221, a driving gate electrode 231, a sensor gate electrode 241, a negative electrode line 251, a light shield 252 and a gate capacitor electrode 253, is formed on an insulating substrate 110 made of transparent glass, etc. The gate wires include a metal single or multiple layers. The gate line 211, the switching gate electrode 221 and the sensor gate electrode 241 are integrally formed. The negative electrode line 251, the light shield 252 and the gate capacitor electrode 253 are also integrally formed.

The gate line 211 which transmits the scanning signal is elongated in a transverse direction and crosses the data line 611. The gate line 211 may have a larger end part to be connected with other layers or an external device. If a gate driving circuit (not shown) which generates the scanning signal is embedded in the insulating substrate 110, the gate line 211 may be directly connected with the gate driving circuit. The switching gate electrode 221 and the sensor gate electrode 241 are connected with the gate line 211 and respectively serve as the control terminals of the switching thin film transistor Tsw and the sensor thin film transistor Tss, respectively.

The driving gate electrode 231 is the control terminal of the driving thin film transistor Tdr and connected with the switching drain electrode 622 of the switching thin film transistor Tsw, and forms the capacitor C1 together with the switching source electrode 621.

The negative electrode line 251 is adjacent to/in parallel with the gate line 211. The negative electrode line 251 receives a negative voltage, e.g., −5V or −10V.

The light shield 252 connected with the negative electrode line 251 is disposed under the light sensor LS and blocks external light from being incident to a light sensor semiconductor layer 450 of the light sensor LS. Thus, the light sensor LS receives only light from the organic light emitting element LD by the light shield 252. Since the light shield 252 receives the negative voltage, it prevents the light sensor semiconductor layer 450 provided on the gate insulating layer 310, from being activated.

The gate capacitor electrode 253 connected with the negative electrode line 251 forms the capacitor C2 together with a data capacitor electrode 671 connected with a sensor drain electrode 641 of the sensor thin film transistor Tss. The data capacitor electrode 671 also forms the capacitor C2 together with a transparent capacitor electrode 840 which is connected with the negative electrode line 251. That is, the gate capacitor electrode 253, the data capacitor electrode 671 and the transparent electrode capacitor electrode 840 are sequentially arranged. The capacitor C2 is formed between the gate capacitor electrode 253 and the data capacitor electrode 671, and between the data capacitor electrode 671 and the transparent capacitor electrode 840.

A gate insulating layer 310 comprising silicon nitride (SiNx) is formed on the insulating substrate 110 and the gate wires.

A semiconductor layer comprising amorphous silicon or a crystalline silicon is formed on the gate insulating layer 310. The semiconductor layer includes a switching semiconductor layer 420 which is disposed in the switching thin film transistor Tsw, a driving semiconductor layer 430 which is disposed in the driving thin film transistor Tdr, a sensor semiconductor layer 440 which is provided in the sensor thin film transistor Tss and the light sensor semiconductor layer 450 which is disposed in the light sensor LS. The switching semiconductor layer 420 and the sensor semiconductor layer 440 have an islet shape while the driving semiconductor layer 430 is elongated along the driving gate electrode 231. The light sensor semiconductor layer 450 is shaped like a stripe to be in parallel with the data line 611. The light sensor semiconductor layer 450 is completely covered by the light shield 252.

An ohmic contact layer 510 including n+ hydrogenated amorphous silicon highly doped with an n-type dopant is formed between the semiconductor layer and data wires (to be described later).

The data wires are formed on the ohmic contact layer 510 and the gate insulating layer 310 that is not covered by the ohmic contact layer 510.

The data wires include the data line 611, a switching source electrode 621, a switching drain electrode 622, the voltage supply line 651, a driving source electrode 631, a driving drain electrode 632, a sensor source electrode 641, the sensor drain electrode 642, the data capacitor electrode 671, a sensor input terminal 672, a sensor output terminal 673 and the sensor line 661. The data line 611 and the switching source electrode 621 are integrally formed. The voltage supply line 651 and the driving source electrode 631 are also integrally formed. The sensor drain electrode 642, the data capacitor electrode 671 and the sensor input terminal 672 are integrally formed.

The data line 611 which transmits the data signal is elongated in a vertical direction, and crosses the gate line 211. The data line 611 may have a larger end part (not shown) to be connected with other layers or an external device. If a data driving circuit (not shown) that generates the data signal is embedded in the insulating substrate 110, the data line 611 may be directly connected with the data driving circuit. The switching source electrode 621 is integrally formed with the data line 611, and serves as the input terminal of the switching thin film transistor Tsw.

The switching drain electrode 622 of the switching thin film transistor Tsw is connected with the driving gate electrode 231 of the driving thin film transistor Tdr.

The voltage supply line 651 is in parallel with the data line 611 and supplies a driving voltage to the driving source electrode 631 of the driving thin film transistor Tdr. The driving source electrode 631 is integrally formed with the voltage supply line 651 and is elongated.

The driving drain electrode 642 is formed at a predetermined interval with the driving source electrode 631, and outputs a current to a pixel electrode 810.

The sensor source electrode 641 of the sensor thin film transistor Tss is connected with the sensor line 661. The sensor line 661 supplies a predetermined voltage, e.g., 5V to the sensor source electrode 641. The sensor drain electrode 642 is integrally formed with the sensor input terminal 672 of the light sensor LS and the data capacitor electrode 671. The sensor input terminal 672 is connected with a first end part of the light sensor semiconductor layer 450. The data capacitor electrode 671 forms the capacitor C2 together with the gate capacitor electrode 253 and the transparent capacitor electrode 840.

The sensor drain electrode 642 has an islet shape and is connected with a second end part of the light sensor semiconductor layer 450 and a next gate line 211. The current flowing in the sensor drain electrode 642 of the sensor thin film transistor Tss is discharged to the next gate line 211.

The sensor line 661 is in parallel with the data line 611 and supplies a predetermined voltage to the sensor source electrode 641 of the sensor thin film transistor Tss. A first end part of the sensor thin film transistor Tss may be connected with the controller 101.

A passivation layer 711 as an insulating layer is formed on the data wires and the semiconductor layer that is not covered by the data wires. The passivation layer 711 may includes silicon nitride (SiNx).

Figure 5:
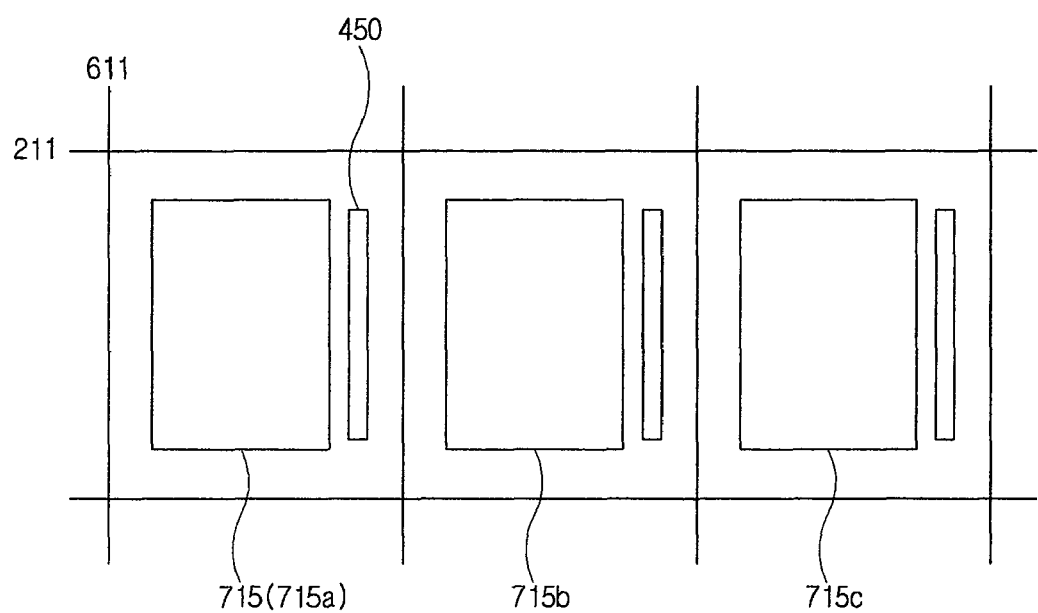
FIG. 5 illustrates an arrangement relation between a color filter and a light sensor semiconductor layer in the display device according to the first exemplary embodiment of the present invention.

A color filter 715 is formed on the passivation layer 711. As shown in FIG. 5, the color filter 715 includes three sub layers 715a, 715b and 715c which have different colors, e.g., red, green and blue colors. The color filter 715 is shaped like an islet and elongated along the data line 611. The color filter 715 is provided in a different region from the light sensor semiconductor layer 450. That is, the color filter 715 does not face the light sensor semiconductor layer 450.

In another embodiment, each of sub layers 715a, 715b and 715c may be formed across various pixels as a stripe pattern.

A planarization layer 721 is formed on the passivation layer 711 and the color filter 715. The planarization layer 721 includes a low-permittivity material whose permittivity is 4 or less. The planarization layer 721 may include SiOF, SiOC, organic material, etc. SiOF or SiOC may be formed by a plasma enhanced chemical vapor deposition (PECVD) method. The organic material may be formed by a spin coating or slit coating. The organic material may include one of benzocyclobutene (BCB) series, olefin series, acrylic resin series, polyimide series, fluoroplastic, etc. The planarization layer 721 may include a photosensitive material of organic insulating material.

A transparent electrode layer is formed on the planarization layer 721. The transparent electrode layer includes the pixel electrode 810, a driving bridge 820, a sensor bridge 830, the transparent capacitor electrode 840 and a light sensor bridge 850. The transparent electrode layer includes a transparent conductive material such as indium tin oxide (ITO) or indium zinc oxide (IZO).

The pixel electrode 810 is called an anode, which supplies a hole to an organic layer 920. The pixel electrode 810 is formed on the light sensor semiconductor layer 450. The pixel electrode 810 is connected with the driving drain electrode 632 through a contact hole 955.

The driving bridge 820 connects the switching drain electrode 622 of the switching thin film transistor Tsw and the driving gate electrode 231 of the driving thin film transistor Tdr. The switching drain electrode 622 and the driving gate electrode 231 are respectively exposed through contact holes 951 and 952 to be connected with each other by the driving bridge 820.

The sensor bridge 830 connects the sensor line 661 and the sensor source electrode 641 of the sensor thin film transistor Tss. The sensor line 661 and the sensor source electrode 641 are respectively exposed through contact holes 953 and 954 to be connected with each other by the sensor bridge 830.

The transparent capacitor electrode 840 is connected with the gate capacitor electrode 253, and forms the capacitor C2 together with the data capacitor electrode 671. The gate capacitor electrode 253 is exposed through a contact hole 956 to be connected with the transparent capacitor electrode 840.

The light sensor bridge 850 connects the gate line 211 of the light sensor LS and the sensor output terminal 673. The gate line 211 and the sensor output terminal 673 are respectively exposed through contact holes 957 and 958 to be connected with each other by the light sensor bridge 850.

A wall 911 is formed between the neighboring pixel electrodes 810. The wall 911 divides the pixel electrodes 810 and defines a pixel region. The wall 911 is formed on the thin film transistors Tsw, Tdr and Tss. The wall 911 includes a photosensitive material such as acrylic resin, or polyimide resin which has heat resistance and solvent resistance, or an inorganic material such as $SiO_2$ and $TiO_2$. The wall 911 may include a double layer having an organic layer and an inorganic layer.

The organic layer 920 is formed on the wall 911 and the pixel electrodes 810. The organic layer 920 includes an organic light emitting layer which emits a white light. The organic layer 920 includes a low molecular material. The organic layer 920 may be formed by an evaporation method. The organic layer 920 is formed across both the pixel electrodes 810 and the wall 911.

The organic light emitting layer may include a red sub organic light emitting layer, a blue sub organic light emitting layer and a green sub organic light emitting layer. The three sub organic light emitting layers are stacked to emit the white light.

The hole transmitted from the pixel electrodes 810 and an electron transmitted from a common electrode 930 are combined into an exciton on the organic layer 920, thereby emitting light during a deactivation process of the exciton.

A common electrode 930 is disposed on the wall 911 and the organic layer 920. The common electrode 930 is called a cathode, and supplies an electron to the organic layer 920. The common electrode 930 covers the overall organic layer 920.

The common electrode 930 may be formed by stacking a calcium layer and a reflective metal layer. It is preferable but not necessary that the common electrode 930 having a low work function is disposed close to the organic layer 920 side. The reflective metal layer may include an opaque metal such as aluminum or silver.

Lithium fluoride increases light emission efficiency depending on a material of the organic layer 920, and a lithium fluoride layer may be formed between the organic layer 920 and the common electrode 930. The pixel electrodes 810, the organic layer 920 and the common electrode 930 are included in the organic light emitting element LD in FIG. 1.

If the common electrode 930 includes an opaque material such as aluminum or silver, light is emitted from the organic layer 920 to the insulating substrate 110, which is called a bottom emission type.

The organic layer 920 may include a hole injecting layer and/or a hole transport layer between the organic light emitting layer and the pixel electrodes 810.

The hole injecting layer and the hole transport layer may employ an amine derivative which is highly fluorescent, e.g., a triphenyl diamine derivative, a styryl amine derivative, and an amine derivative having an aromatic condensed ring.

The organic layer 920 may include an electron injecting layer and an electron transport layer between the organic light emitting layer and the common electrode 930.

The electron transport layer may employ a quinoline derivative, and particularly, aluminum tris(8-hydroxyquinoline) (Alq3). The electron transport layer may also employ a phenyl anthracene derivative and a tetra arylethene derivative.

The electron injecting layer may include barium (Ba) or calcium (Ca).

Hereinafter, an operation of the light sensor LS will be described in detail.

If a gate on voltage is supplied through the gate line 211, the switching thin film transistor Tsw and the sensor thin film transistor Tss are turned on.

While the sensor thin film transistor Tss is turned on, the capacitor C2 is charged through the sensor line 661 and the sensor bridge 830.

While the switching thin film transistor Tsw is turned on, a data voltage is supplied to the switching drain electrode 622 through the data line 611. The data voltage is supplied to the driving gate electrode 231 of the driving thin film transistor Tdr through the driving bridge 820 to turn on the driving thin film transistor Tdr.

The driving current is supplied to the driving drain electrode 632 through the driving thin film transistor Tdr in an on state. The amount of the driving current is determined by the data voltage. The driving current is supplied from the driving drain electrode 632 to the pixel electrodes 810, thereby enabling the organic layer 920 to emit light.

Light emitted from the organic layer 920 activates the light sensor semiconductor layer 450 so that a current flows from the sensor input terminal 672 to the sensor output terminal 673. In this case, the charge of the capacitor C2 decreases. Then, the controller 101 controls the data voltage based on the amount of the current supplied to recharge the capacitor C2. The current flowing in the sensor output terminal 673 is discharged to the next gate line 211 through the sensor bridge 830.

As shown in FIG. 2, both ends of the light sensor semiconductor layer 450 are connected with the sensor input terminal 672 and the sensor output terminal 673. The light shield 252 is disposed under the light sensor semiconductor layer 450, leaving the gate insulating layer 310 therebetween. Under such a configuration, the light sensor semiconductor layer 450, the sensor input terminal 672, the sensor output terminal 673 and the light shield 252 have a possibility of forming a thin film transistor. If such a thin film transistor is formed, it is hard to control a current flow of the light sensor semiconductor layer 450. Then, the light sensor LS may have difficulties in determining the intensity of the light from the organic layer 920. However, such a problem may be solved by supplying the negative voltage to the light shield 252.

Most of the white light emitted from the organic layer 920 is emitted to the outside through the color filter 715 and the insulating substrate 110, and is assigned with colors while traveling the color filter 715. A part of the white light emitted from the organic layer 920 is incident to the light sensor semiconductor layer 450 to operate the light sensor LS.

As shown in FIG. 5, since the color filter 715 and the light sensor semiconductor layer 450 are formed in different regions, the light sensor semiconductor layer 450 receives a white light which does not travel the color filter 715. Thus, sensitivity of the light sensor LS is not affected by the sub color filters 715a, 715b and 715c.

With the foregoing configuration, the light sensor LS senses the intensity of the light from the organic layer 920 relatively precisely, thereby improving a display quality of the display device.

Hereinafter, a method of manufacturing the display device 1 according to the first exemplary embodiment of the present invention will be described with reference to FIGS. 6A to 13B. FIGS. 6A, 7A, 8A, 9A, 10A, 11A and 12A are sectional views of the display device 1, taken along line III-III in FIG. 2. FIGS. 6B, 7B, 8B, 9B, 10B, 11B and 12B are sectional views of the display device 1, taken along line IV-IV in FIG. 2.

Figure 6A:
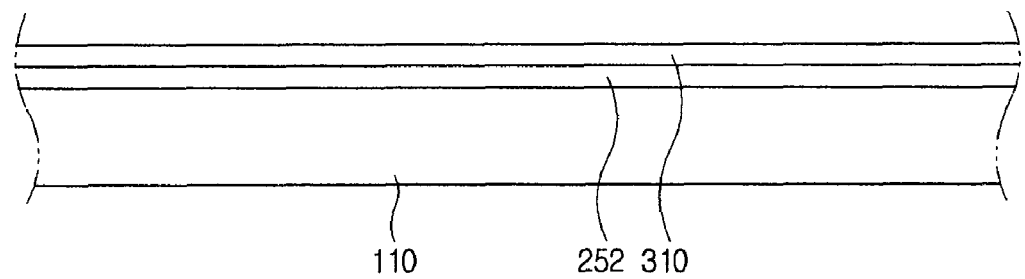
FIGS. 6A to 13B sequentially illustrate a manufacturing method of the display device according to the first exemplary embodiment of the present invention.
Figure 6B:
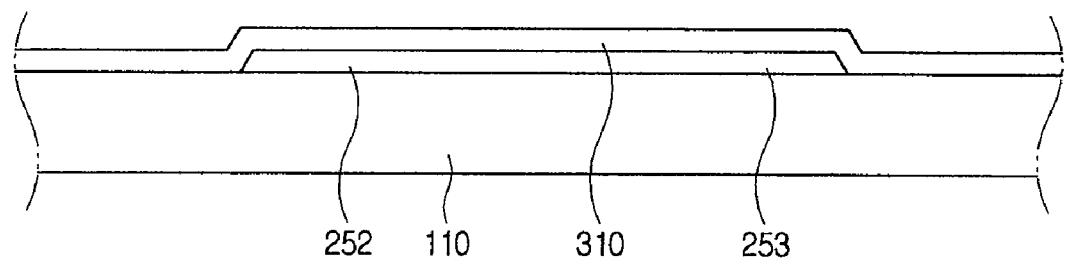

As shown in FIGS. 6A and 6B, a gate metal layer is formed and patterned on the insulating substrate 110 to form the light shield 252 and the gate capacitor electrode 253 after depositing a gate metal material on the entire insulating substrate 110 by a sputtering method. Then, the gate insulating layer 310 is formed on the light shield 252 and the gate capacitor electrode 253. The gate insulating layer 310 may include silicon nitride (SiNx) and may be formed by a chemical vapor deposition (CVD) method.

Figure 7A:
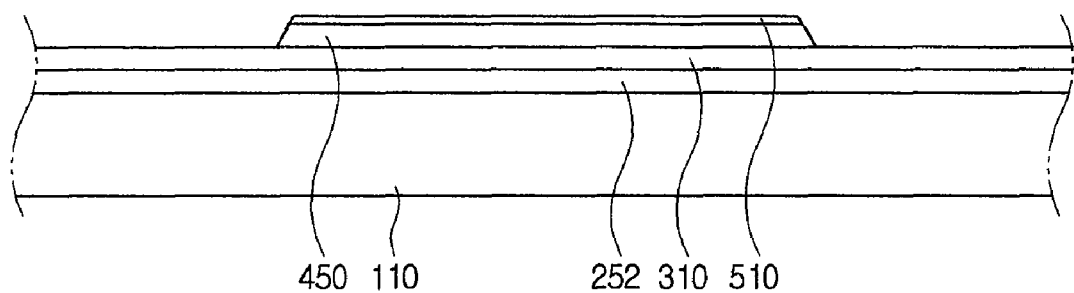
Figure 7B:
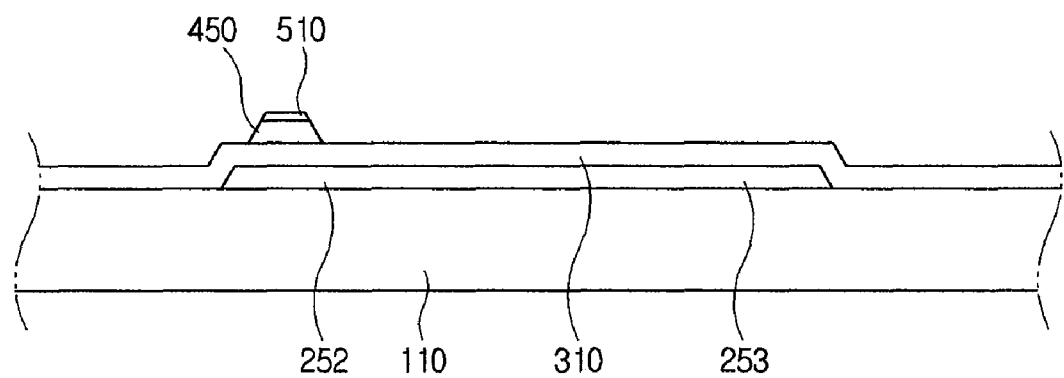

As shown in FIGS. 7A and 7B, the light sensor semiconductor layer 450 having an islet shape and the ohmic contact layer 510 are formed on the gate insulating layer 310. The gate insulating layer 310, the light sensor semiconductor layer 450 and the ohmic contact layer 510 may be consecutively formed.

Figure 8A:
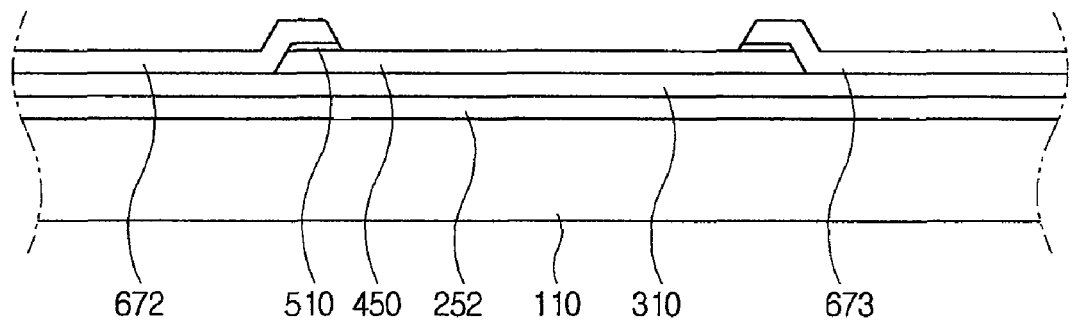
Figure 8B:
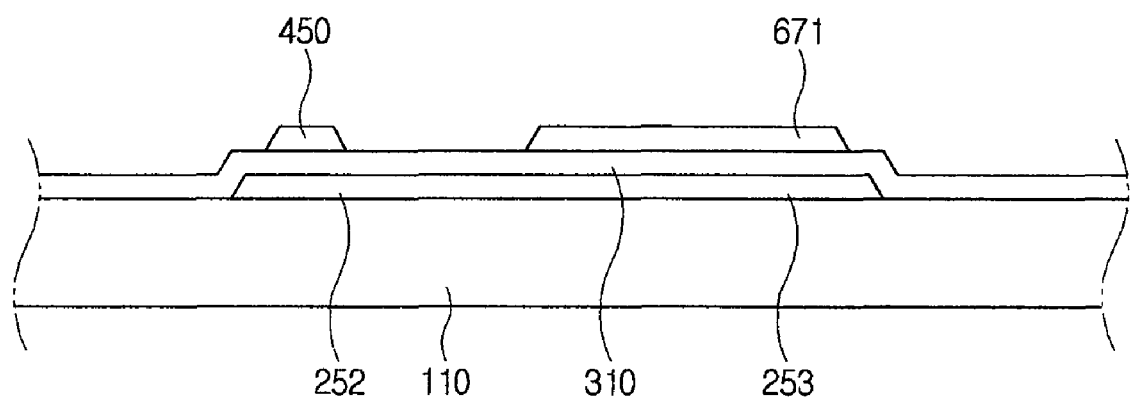

As shown in FIGS. 8A and 8B, a data metal layer is formed and patterned to form the data capacitor electrode 671, the sensor input terminal 672 and the sensor output terminal 673 after depositing a data metal material on the entire insulating substrate 110 by a sputtering method. The data capacitor electrode 671 and the sensor input terminal 672 are integrally formed. In this process, the ohmic contact layer 510 that is not covered by the sensor input terminal 672 and the sensor output terminal 673 is removed therefrom. It is preferable but not necessary that oxygen plasma is applied to stabilize a surface of the light sensor semiconductor layer 450 that is exposed after removing the ohmic contact layer 510. The ohmic contact layer 510 may be dry-etched by plasma.

Figure 9A:
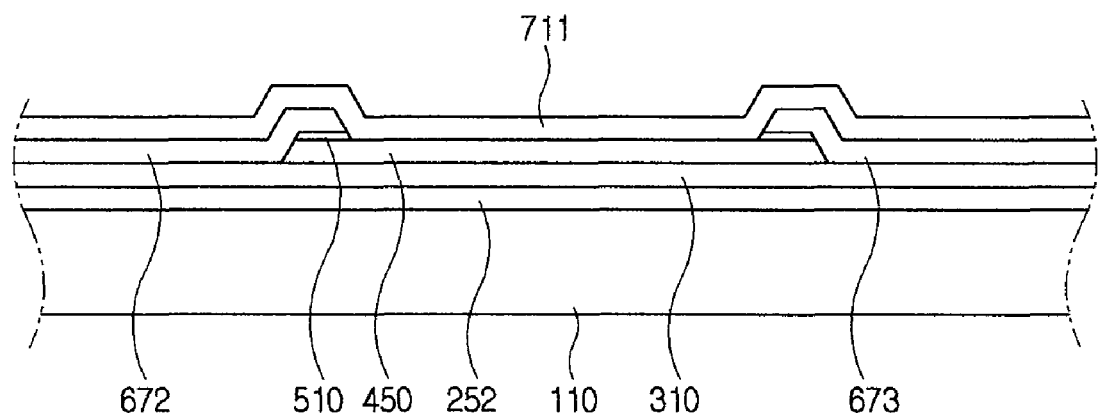
Figure 9B:
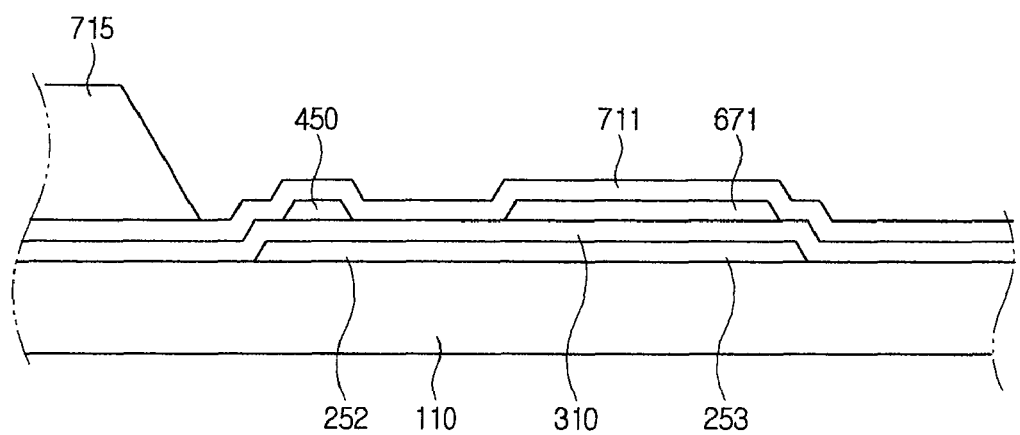

As shown in FIGS. 9A and 9B, the passivation layer 711 and the color filter 715 are formed. The passivation layer 711 may include silicon nitride (SiNx) and may be formed by a chemical vapor deposition (CVD) method. A photosensitive color filter layer may be formed, exposed and developed to form the color filter 715.

Figure 10A:
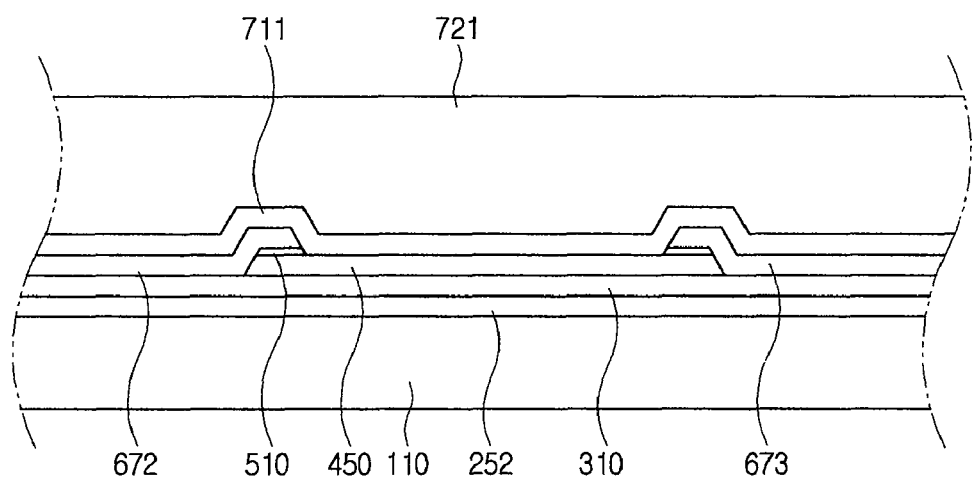
Figure 10B:
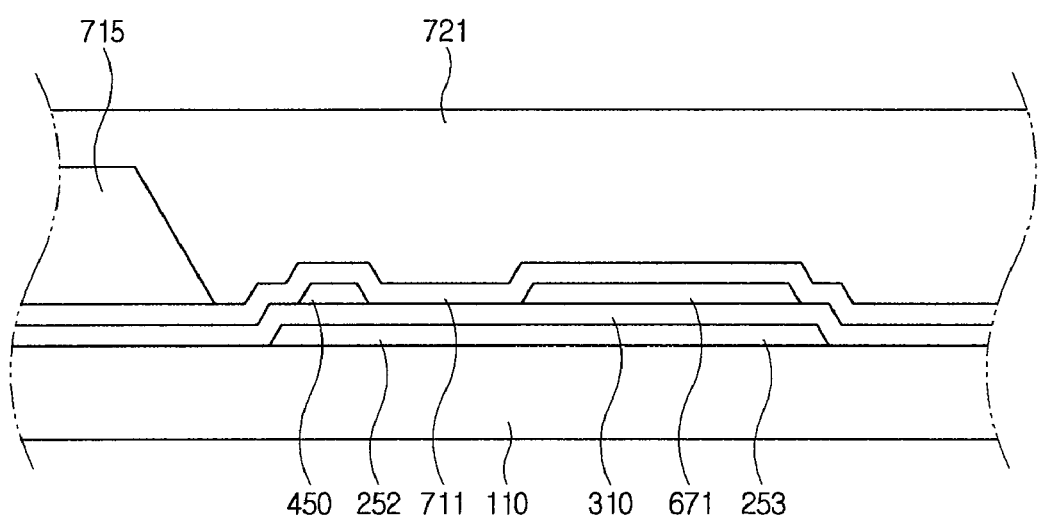

As shown in FIGS. 10A and 10B, the planarization layer 721 is formed on the passivation layer 711 and the color filter 715. The planarization layer 721 may be formed by applying a plasma enhanced chemical vapor deposition (PECVD) method to SiOF, SiOC, etc. or by applying a spin coating or slit coating to an organic material.

Figure 11A:
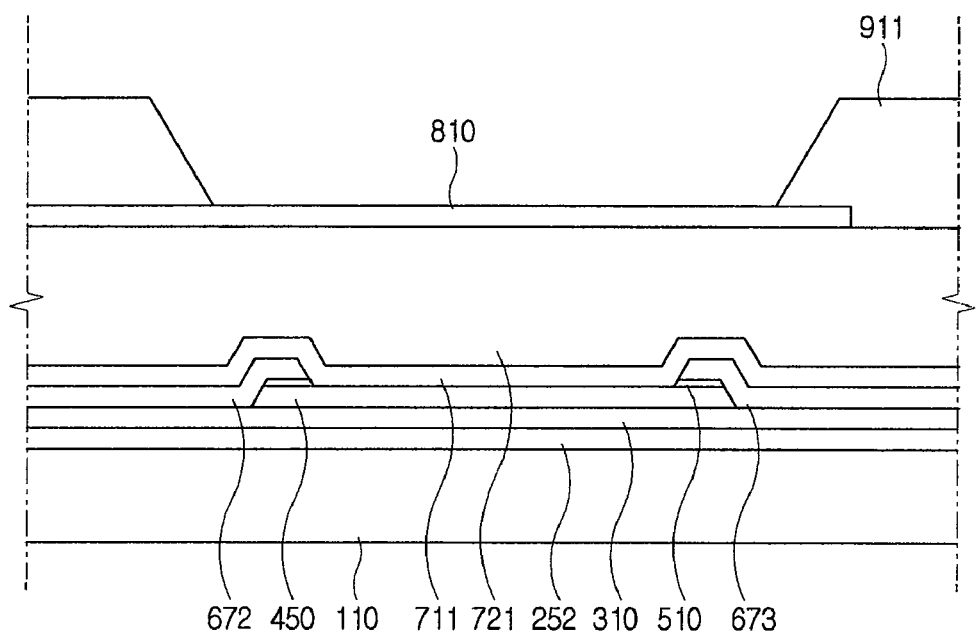
Figure 11B:
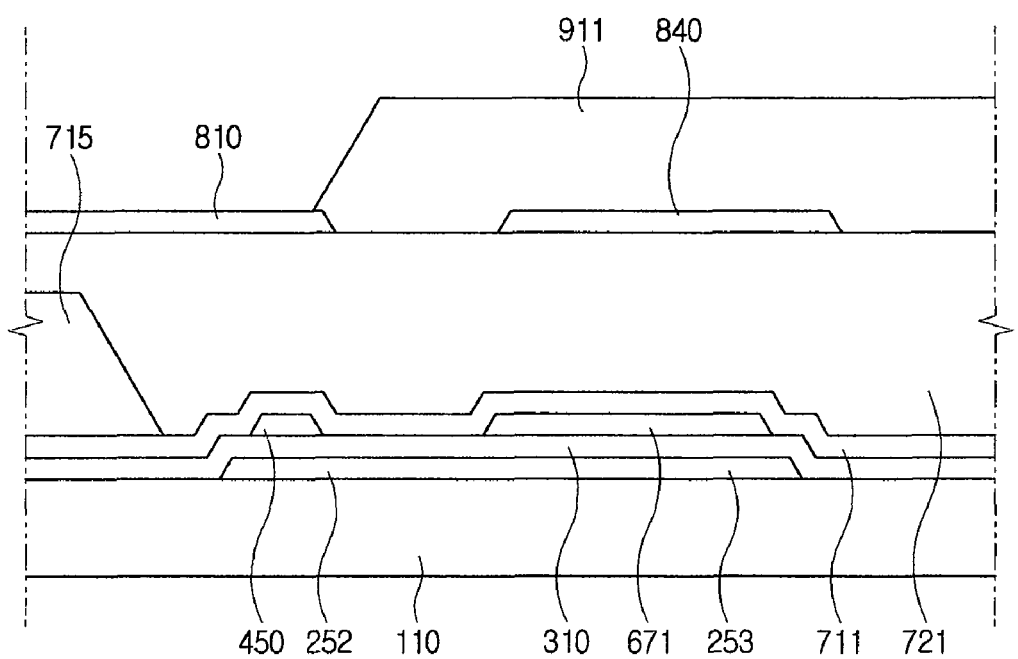

As shown in FIGS. 11A and 11B, a transparent conductive layer including indium tin oxide (ITO), indium zinc oxide (IZO), etc. is deposited and photolithographed to form the pixel electrodes 810 and the transparent capacitor electrode 840. Nitrogen may be used in a pre-heating process before depositing ITO or IZO. Then, a wall material is deposited on an entire surface of the pixel electrode 810 and the transparent electrode 840 and photolithographed to form the wall 911. The wall material layer includes a photosensitive material and may be deposited by a slit coating or a spin coating.

Figure 12A:
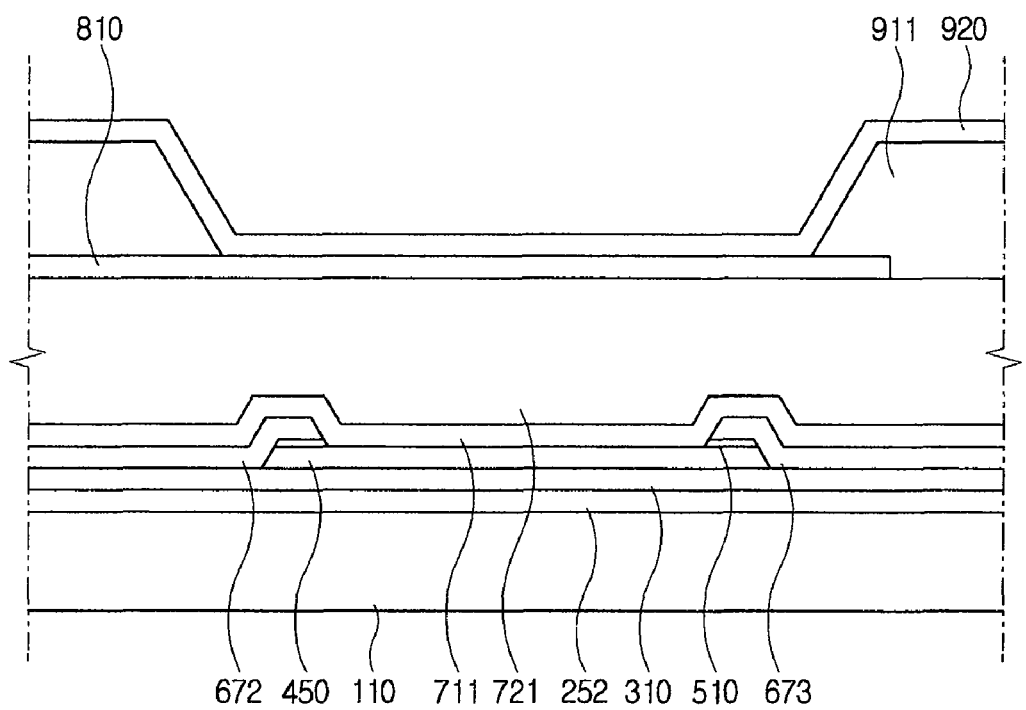
Figure 12B:
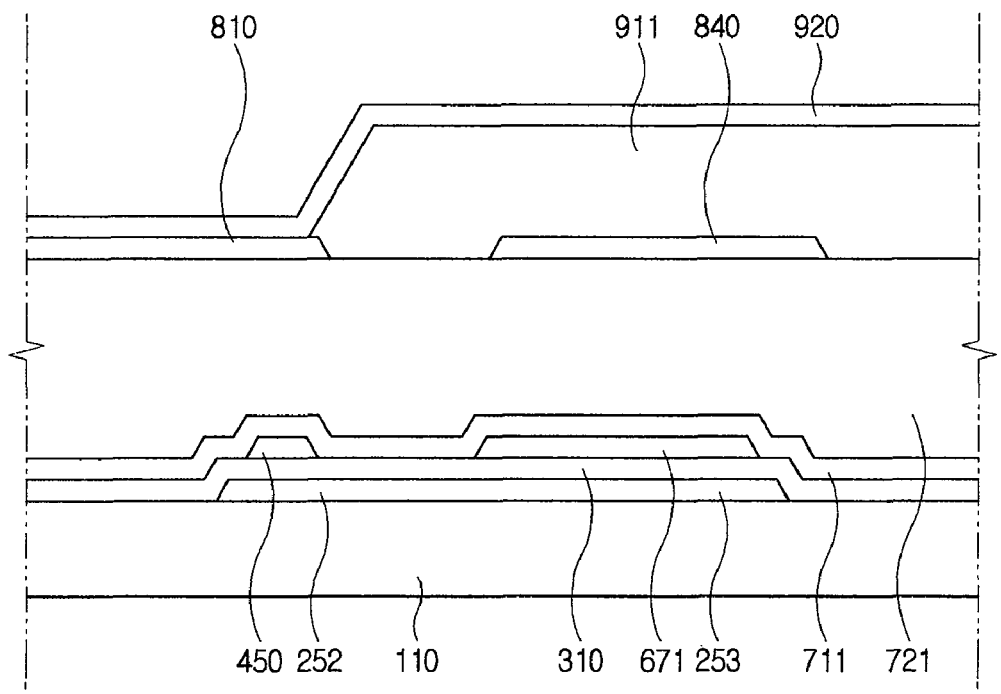

As shown in FIGS. 12A and 12B, the organic layer 920 is formed on the pixel electrodes 810 and the wall 911.

Figure 13A:
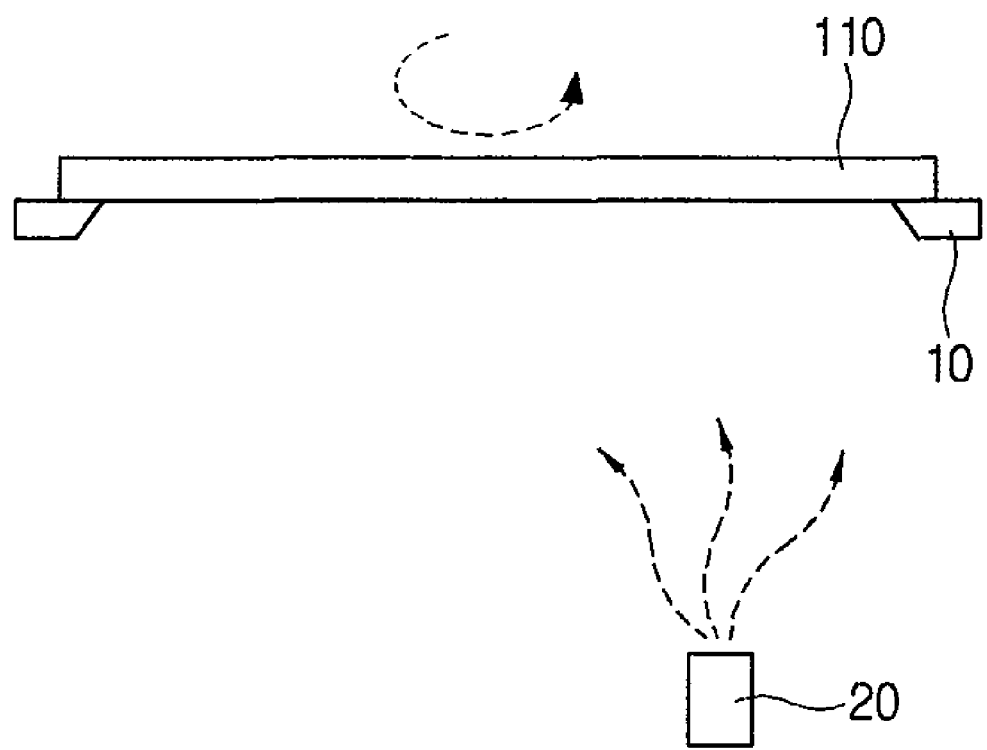
Figure 13B:
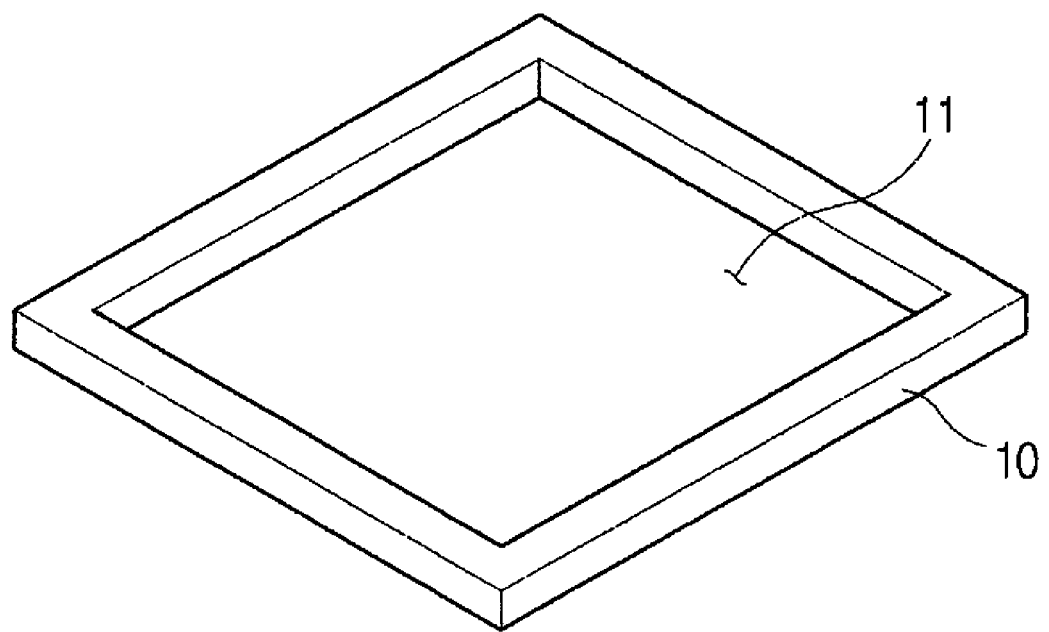

A method of forming the organic layer 920 will be described with reference to FIGS. 13A and 13B.

The insulating substrate 110 is turned so that the pixel electrodes 810 and the wall 911 are directed downward. Then, an open mask 10 is disposed on the insulating substrate 110. As shown in FIG. 13B, the open mask 10 is shaped like a rectangular frame which includes an opening part 511.

While rotating the insulating substrate 110 and the open mask 10, a source 20 which is disposed below supplies an organic vapor to the insulating substrate 110. The source 20 includes an organic material which is used in the organic layer 920. The organic material is vaporized when being heated, thereby generating organic vapor. When contacting the insulating substrate 110 or the open mask 10, the organic vapor is cooled down and solidified to form the organic layer 920.

The organic layer 920 is formed on an entire display region according to the shape of the open mask 10. A non-display region is an area where the organic layer 920 is not formed by being covered by the open mask 10, and includes a pattern to be connected with an external circuit or receive a voltage.

After the organic layer 920 is formed, the common electrode 930 is formed by a similar forming method of the organic layer 920 to complete the display device 1.

Figure 14:
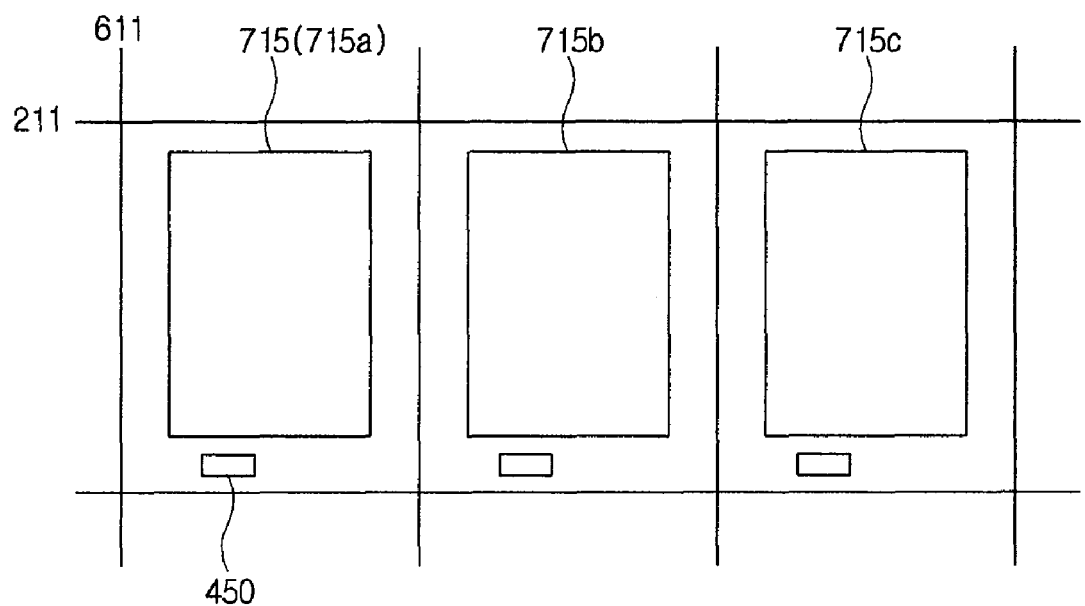
FIG. 14 illustrates the relation between a color filter and a light sensor semiconductor layer in the display device according to a second exemplary embodiment of the present invention.

A display device according to a second embodiment of the present invention will be described with reference to FIG. 14.

A color filter 715 according to the second embodiment of the present invention has a larger size than that according to the first exemplary embodiment of the present invention. Meanwhile, a light sensor semiconductor layer 450 is disposed under pixels and formed in a smaller size. According to the second exemplary embodiment of the present invention, an aperture ratio may be improved by downsizing the light sensor semiconductor layer 450. The arrangement of the color filter 715 and the light sensor semiconductor layer 450 may vary in consideration of the aperture ratio, etc.

Figure 15:
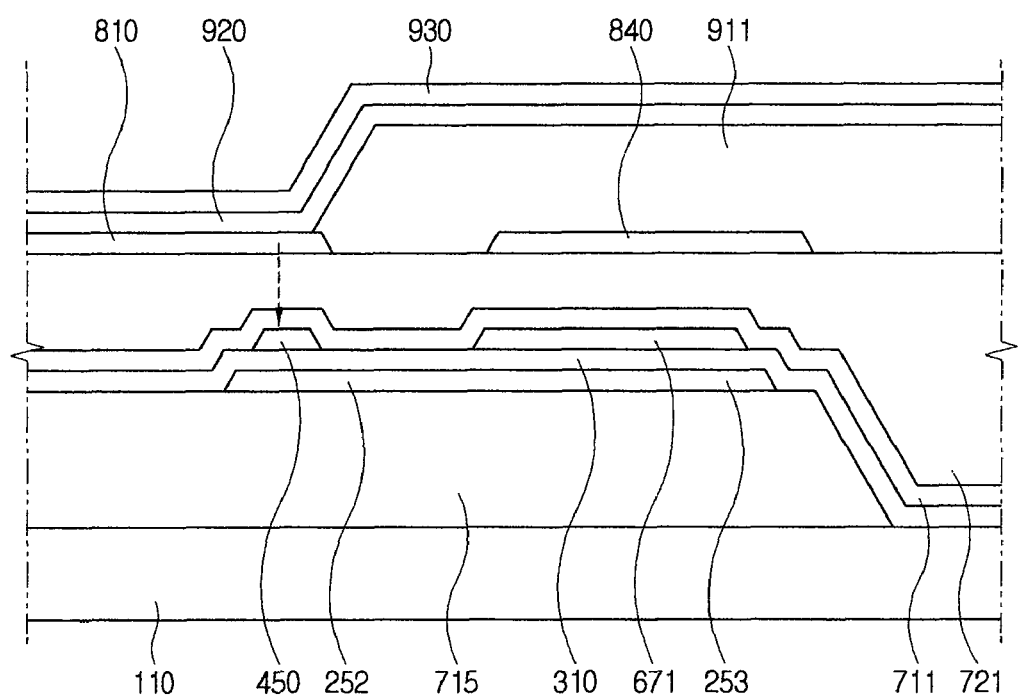
FIG. 15 is a sectional view of a display device according to a third exemplary embodiment of the present invention.

A display device according to a third exemplary embodiment of the present invention will be described with reference to FIG. 15.

A color filter 715 is formed on an insulating substrate 110 and extends to a lower part of a light sensor semiconductor layer 450. A white light of an organic layer 920 is incident to the light sensor semiconductor layer 450 without traveling the color filter 715. Thus, a light sensor LS is not affected by the color filter 715.

In another exemplary embodiment of the present invention, a color filter 715 may extend to a lower part of a light sensor semiconductor layer 450 and may be formed on a gate insulating layer 310.

Figure 16:
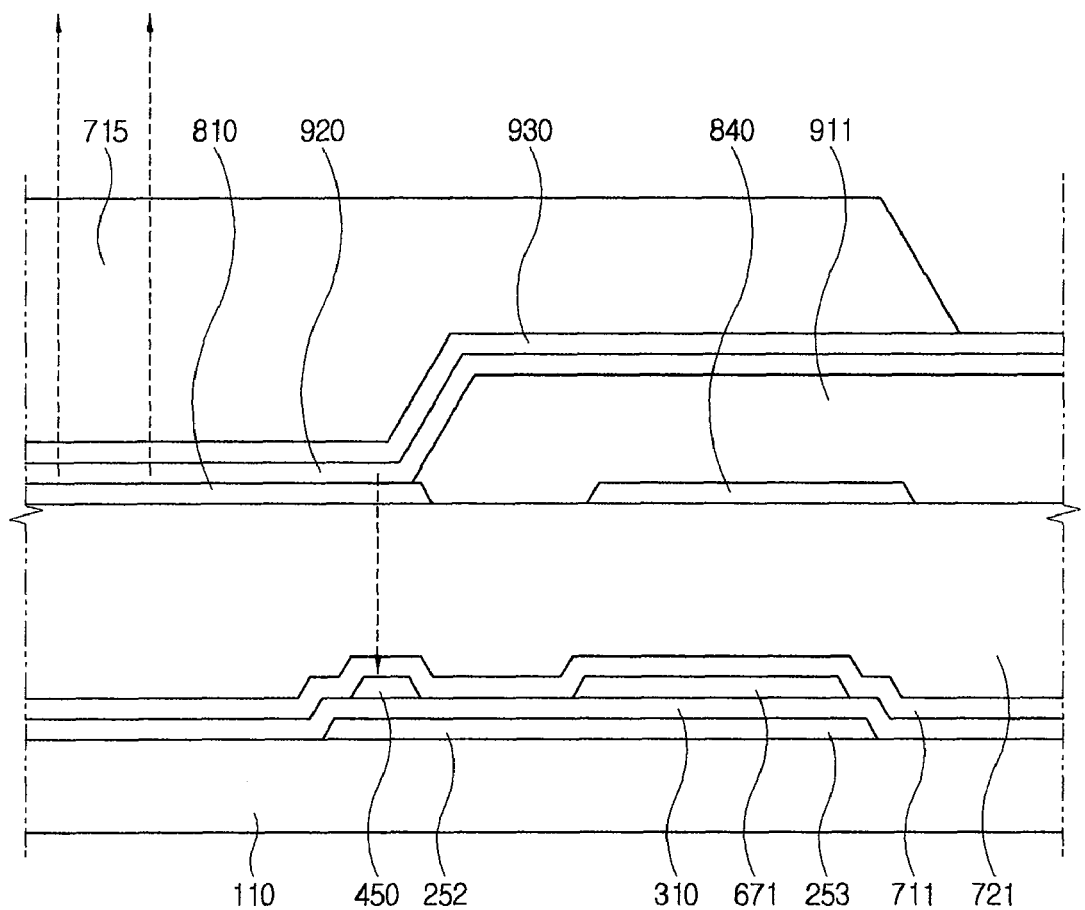
FIG. 16 is a sectional view of a display device according to a fourth exemplary embodiment of the present invention.

A display device 1 according to a fourth exemplary embodiment of the present invention will be described with reference to FIGS. 16 and 17.

A common electrode 930 includes a transparent material and a light is emitted from an organic layer 920 to both an insulating substrate 110 and the common electrode 930. A color filter 715 is formed on the common electrode 930.

Figure 17:
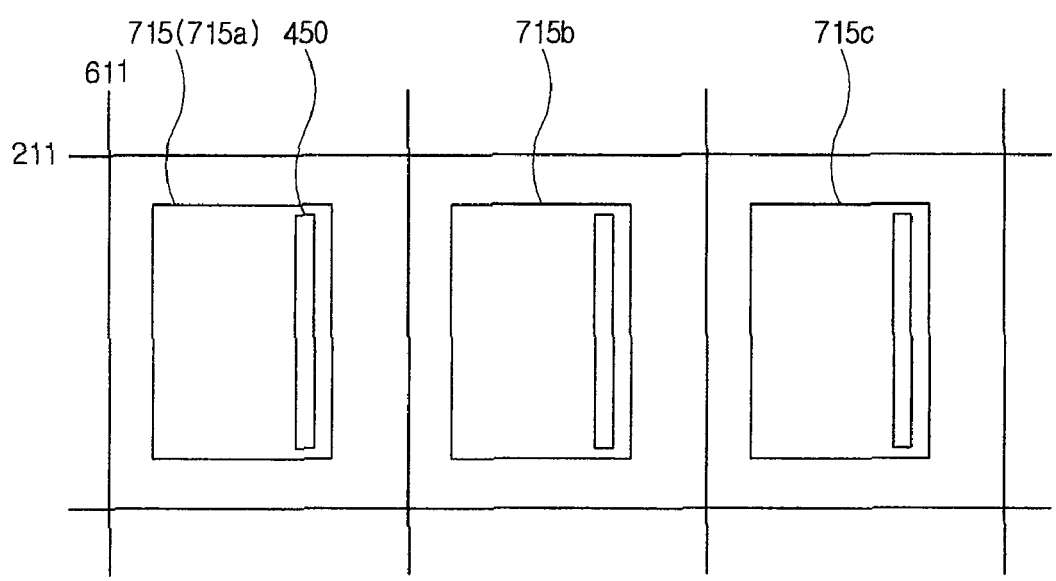
FIG. 17 illustrates the relation between a color filter and a light sensor semiconductor layer in the display device according to the fourth exemplary embodiment of the present invention.

As shown in FIG. 17, the color filter 715 overlaps a light sensor semiconductor layer 450. Since light is emitted from the organic layer 920 to the light sensor semiconductor layer 450 without traveling the color filter 715, the light sensor LS is not affected by the color filter 715.

Figure 18:
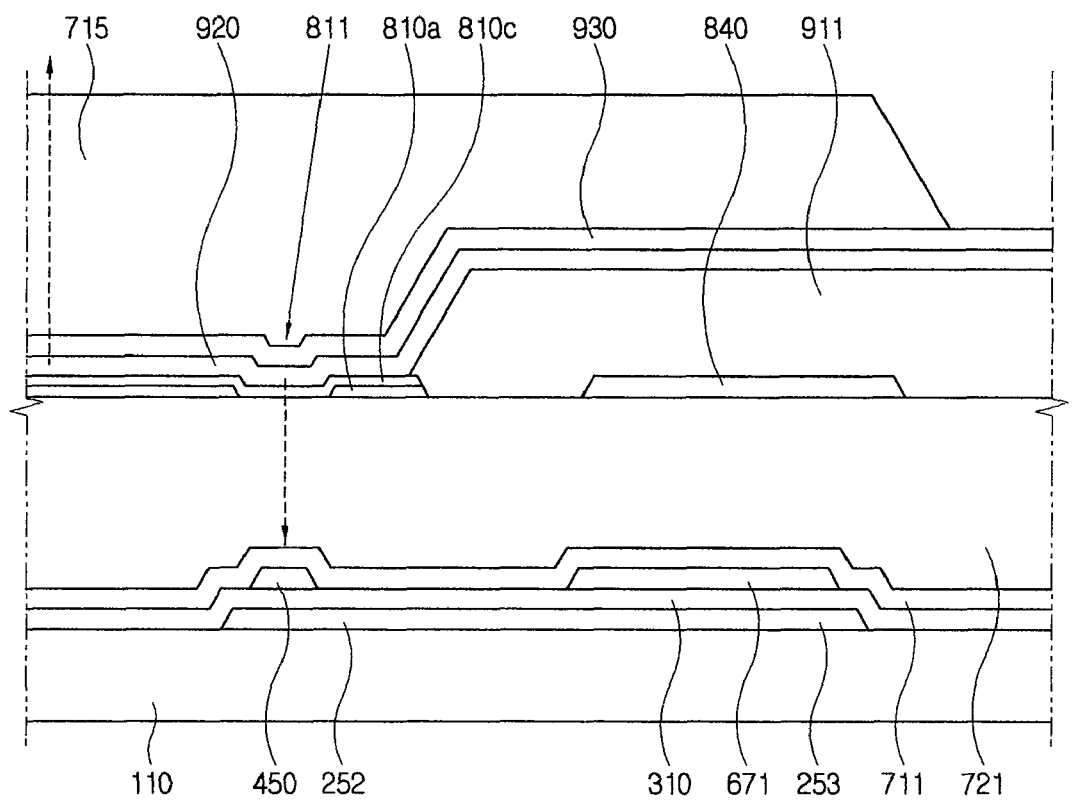
FIG. 18 is a sectional view of a display device according to a fifth exemplary embodiment of the present invention.

A display device according to a fifth exemplary embodiment of the present invention will be described with reference to FIGS. 18 and 19.

A pixel electrode 810 includes a first layer 810a comprising a reflective metal, and a second layer 810c comprising a transparent conductive material. The color filter 715 is formed on a common electrode 930.

Figure 19:
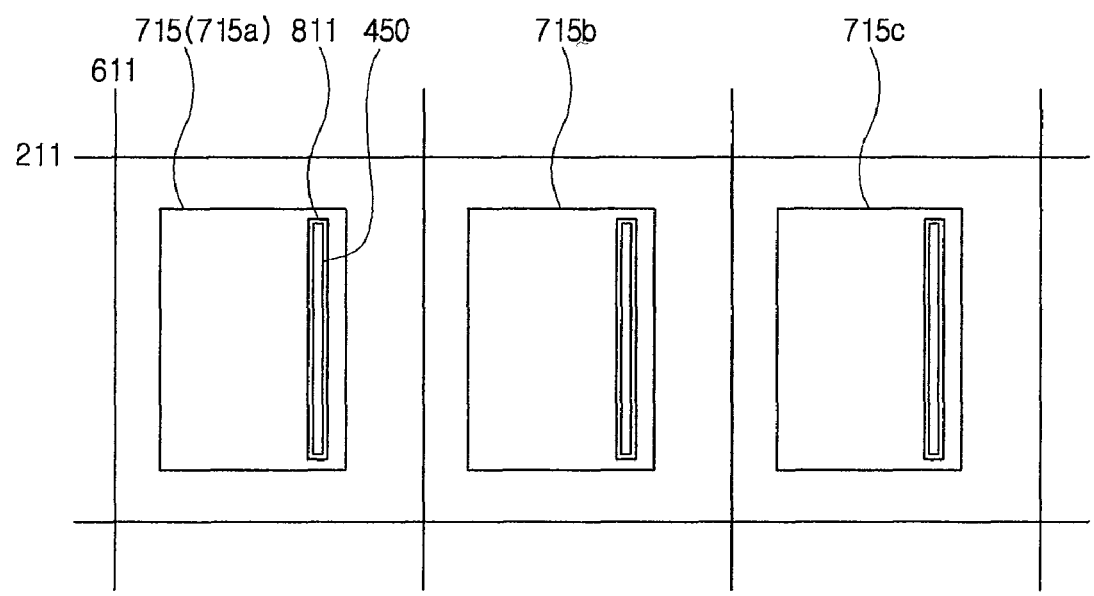
FIG. 19 illustrates the relation between a color filter, a light sensor semiconductor layer and a pixel electrode in the display device according to the fifth exemplary embodiment of the present invention.

As shown in FIG. 19, the color filter 715 overlaps a light sensor semiconductor layer 450. Since light is emitted from an organic layer 920 to the light sensor semiconductor layer 450 without traveling the color filter 715, a light sensor LS is not affected by the color filter 715. The first layer 810a having the reflective metal includes an aperture 811 corresponding to the light sensor semiconductor layer 450.

Most of light emitted from the organic layer 920 to the pixel electrode 810 is reflected by the first layer 810a to be incident to the color filter 715. Meanwhile, light emitted from the organic layer 920 disposed on the light sensor semiconductor layer 450 is not reflected by the first layer 810a due to the aperture 811. Instead, the light is supplied to the light sensor semiconductor layer 450 through the second layer 810c.

Figure 20:
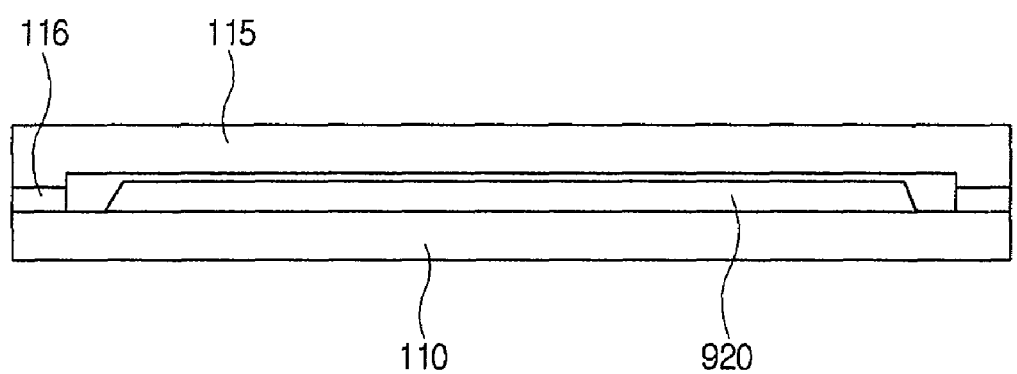
FIGS. 20 and 21 illustrate a display device according to a sixth exemplary embodiment of the present invention.
Figure 21:
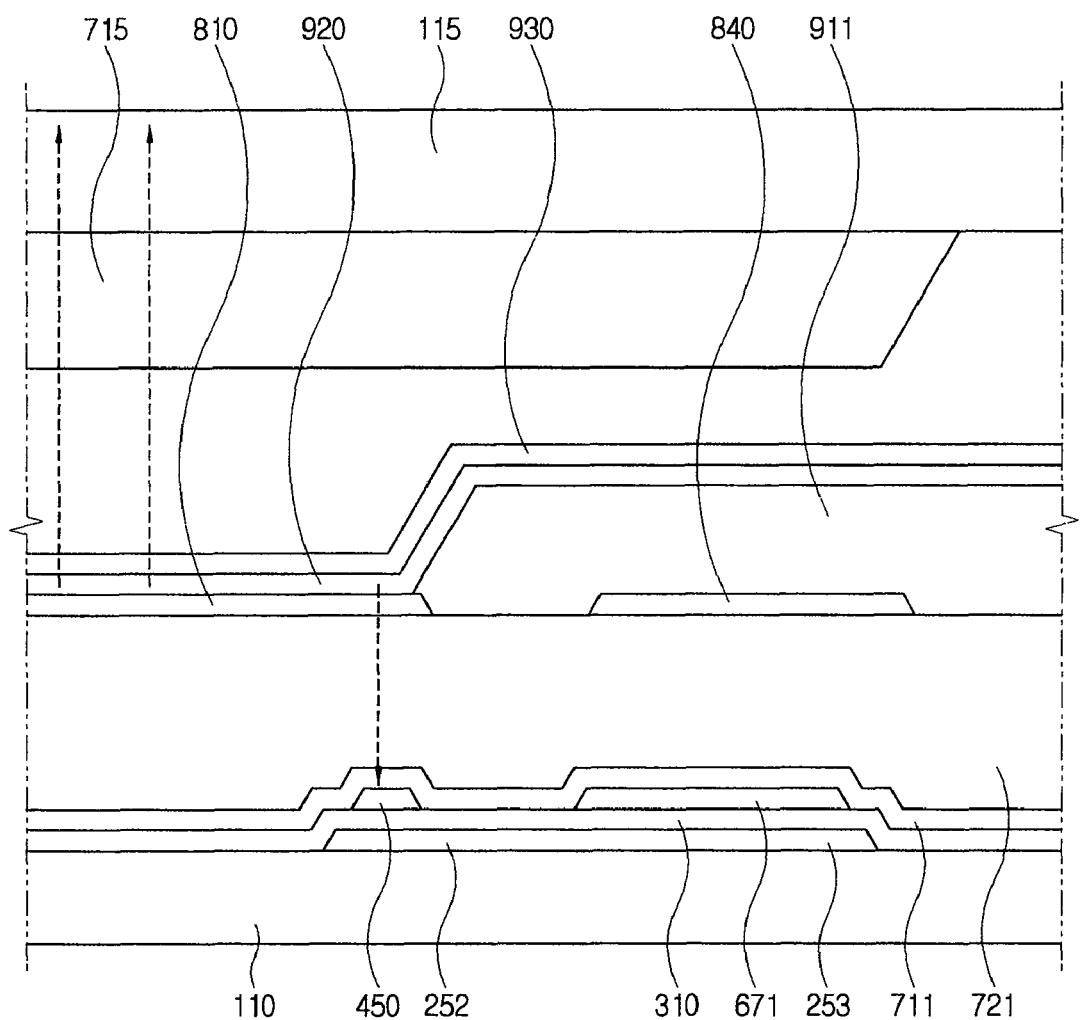

A display device according to a sixth exemplary embodiment of the present invention will be described with reference to FIGS. 20 and 21.

A sealant 116 is formed along an insulating substrate 110. An encapsulating substrate 115 is sealed with the sealant 116. The encapsulating substrate 115 includes a transparent material such as glass, and prevents air and moisture from being introduced to an organic layer 920. Light is emitted from the organic layer 920 to the outside through the encapsulating substrate 115.

A color filter 715 is formed within the encapsulating substrate 115. Light emitted from the organic layer 920 to a light sensor semiconductor layer 450 does not travel the color filter 715. Thus, a light sensor LS is not affected by the color filter 715.

In the fourth to sixth exemplary embodiments of the present invention, the light shield 252 may be removed as necessary.

As described above, the present invention provides a display device which provides a stable display quality.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display device, comprising:
    an insulating substrate;
    a light sensor comprising a semiconductor layer disposed in a first region, the light sensor further comprising a sensor input terminal and a sensor output terminal electrically connected to the semiconductor layer, the light sensor being disposed on or above the insulating substrate;
    a first electrode, an organic light emitting layer, and a second electrode which are disposed on or above the light sensor; and
    a color filter disposed between the insulating substrate and the first electrode, the color filter being disposed in a second region that is different from the first region,
    wherein the first region and the second region are disposed in a pixel region.

2. The display device according to claim 1, wherein the first electrode, the organic light emitting layer and the second electrode are sequentially disposed on the light sensor.

3. The display device according to claim 1, wherein the semiconductor layer comprises at least one of amorphous silicon and crystalline silicon.

4. The display device according to claim 3, wherein the organic light emitting layer emits a white light.

5. The display device according to claim 3, further comprising a sensor thin film transistor which is connected to the sensor input terminal of the light sensor, and the sensor input terminal of the light sensor is connected to a drain electrode of the sensor thin film transistor.

6. The display device according to claim 1, further comprising a controller which controls a data voltage supplied to one of the first electrode and the second electrode based on an output of the light sensor.

7. The display device, comprising:
    an insulating substrate;
    a light sensor comprising a semiconductor layer disposed in a first region, the light sensor further comprising a sensor input terminal and a sensor output terminal electrically connected to the semiconductor layer, the light sensor being disposed on or above the insulating substrate;

a first electrode, an organic light emitting layer and a second electrode which are disposed on or above the light sensor; and a color filter disposed between the insulating substrate and the first electrode, the color filter being disposed in a second region that is different from the first region;

wherein the semiconductor layer comprises at least one of amorphous silicon and crystalline silicon, and wherein the first region and the second region are disposed in a pixel region.

8. The display device according to claim 7, wherein the first electrode, the organic light emitting layer and the second electrode are sequentially disposed on the light sensor.

9. The display device according to claim 8, wherein the organic light emitting layer emits a white light.

10. The display device according to claim 9, further comprising a sensor thin film transistor which is connected to the sensor input terminal of the light sensor, and the sensor input terminal of the light sensor is connected to a drain electrode of the sensor thin film transistor.

11. The display device comprising:
an insulating substrate;
a light sensor comprising a semiconductor layer disposed in a first region, the light sensor further comprising a sensor input terminal and a sensor output terminal electrically connected to the semiconductor layer, the light sensor being disposed on or above the insulating substrate;
a first electrode, an organic light emitting layer, and a second electrode which are sequentially disposed on or above the light sensor, the organic light emitting layer being disposed between the first electrode and the second electrode; and
a color filter disposed between the insulating substrate and the first electrode, the color filter being disposed in a second region that is different from the first region,
wherein the organic light emitting layer emits a white light, and
wherein the first region and the second region are disposed in a pixel region.

12. The display device according to claim 11, wherein the first electrode, the organic light emitting layer and the second electrode are sequentially disposed on the light sensor.

13. The display device according to claim 12, wherein the semiconductor layer comprises at least one of amorphous silicon and crystalline silicon.

14. The display device according to claim 13, further comprising a sensor thin film transistor which is connected to the sensor input terminal of the light sensor, and the sensor input terminal of the light sensor is connected to a drain electrode of the sensor thin film transistor.

15. A display device, comprising:
an insulating substrate;
a light sensor comprising a semiconductor layer, the light sensor further comprising an input terminal and an output terminal electrically connected to the semiconductor layer, the light sensor being disposed on or above the insulating substrate;
a first electrode, an organic light emitting layer and a second electrode which are disposed on the light sensor; and
a color filter layer which assigns colors to a light emitted by the organic light emitting layer, and is not disposed on a path of the light between the organic light emitting layer and the light sensor,
wherein the light sensor is disposed in a pixel region.

16. The display device according to claim 15, wherein the first electrode, the organic light emitting layer and the second electrode are sequentially disposed on the light sensor.

17. The display device according to claim 16, wherein the semiconductor layer includes at least one of amorphous silicon and crystalline silicon.

18. The display device according to claim 16, wherein the organic light emitting layer emits a white light.

19. The display device according to claim 18, wherein the semiconductor layer is disposed in a first region, and the color filter layer is disposed in a second region, other than the first region, between the insulating substrate and the first electrode.

20. The display device according to claim 18, further comprising an encapsulating substrate which is disposed over the second electrode, wherein the color filter layer is disposed on the encapsulating substrate.

21. The display device according to claim 20, further comprising a controller which controls a data voltage supplied to one of the first electrode and the second electrode based on an output of the light sensor.

* * * * *